United States Patent
Alger

(10) Patent No.: US 11,451,616 B2
(45) Date of Patent: **\*Sep. 20, 2022**

(54) TERMINAL EMULATION OVER HTML

(71) Applicant: Ivanti, Inc., South Jordan, UT (US)

(72) Inventor: Daniel Thomas Alger, South Salt Lake, UT (US)

(73) Assignee: Ivanti, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,620

(22) Filed: Dec. 18, 2020

(65) Prior Publication Data

US 2021/0320966 A1 Oct. 14, 2021

Related U.S. Application Data

(63) Continuation of application No. 16/043,055, filed on Jul. 23, 2018, now Pat. No. 10,873,621, which is a continuation of application No. 14/464,369, filed on Aug. 20, 2014, now Pat. No. 10,033,797.

(51) Int. Cl.
*H04L 67/08* (2022.01)
*H04L 67/02* (2022.01)
*H04L 69/08* (2022.01)

(52) U.S. Cl.
CPC .............. *H04L 67/08* (2013.01); *H04L 67/02* (2013.01); *H04L 69/08* (2013.01)

(58) Field of Classification Search
None
See application file for complete search history.

(56) References Cited

U.S. PATENT DOCUMENTS

| | | | | |
|---|---|---|---|---|
| 5,958,013 A * | 9/1999 | King | ...................... | H04L 67/142 709/227 |
| 5,964,836 A * | 10/1999 | Rowe | ...................... | G06F 9/451 709/221 |
| 6,011,915 A * | 1/2000 | Aaker | ................... | G06F 13/107 703/23 |
| 6,182,129 B1 * | 1/2001 | Rowe | ...................... | H04L 29/06 709/221 |
| 6,205,415 B1 * | 3/2001 | Butts | ......................... | G06F 9/54 703/27 |
| 6,205,416 B1 * | 3/2001 | Butts | ......................... | G06F 9/54 703/27 |
| 6,205,417 B1 * | 3/2001 | Butts | ..................... | G06F 13/107 703/27 |
| 6,233,543 B1 * | 5/2001 | Butts | ......................... | G06F 9/54 703/27 |
| 6,412,009 B1 * | 6/2002 | Erickson | ................. | H04L 29/06 709/217 |
| 7,716,339 B2 * | 5/2010 | Chitilian | ............... | H04L 69/329 709/227 |
| 10,033,797 B1 * | 7/2018 | Alger | ...................... | H04L 67/08 |

(Continued)

*Primary Examiner* — Ranodhi Serrao

(57) ABSTRACT

A method for converting data between two data transfer protocols is described. The method includes receiving first HyperText Transfer Protocol (HTTP) enabled data from a first computer system. The method also includes converting the first HTTP-enabled data obtained from the first computer system to first remote terminal session data. The method also includes sending the first remote terminal session data to a second computer system via a remote terminal session.

20 Claims, 5 Drawing Sheets

(56) References Cited

U.S. PATENT DOCUMENTS

| | | | |
|---|---|---|---|
| 2003/0093585 A1* | 5/2003 | Allan | H04L 67/02 |
| | | | 719/330 |
| 2003/0225726 A1* | 12/2003 | Simpson | G06F 16/50 |
| 2009/0113017 A1* | 4/2009 | Parcher | G06F 16/9577 |
| | | | 709/207 |
| 2013/0060838 A1* | 3/2013 | Yaffe | G06F 9/5027 |
| | | | 709/203 |

* cited by examiner

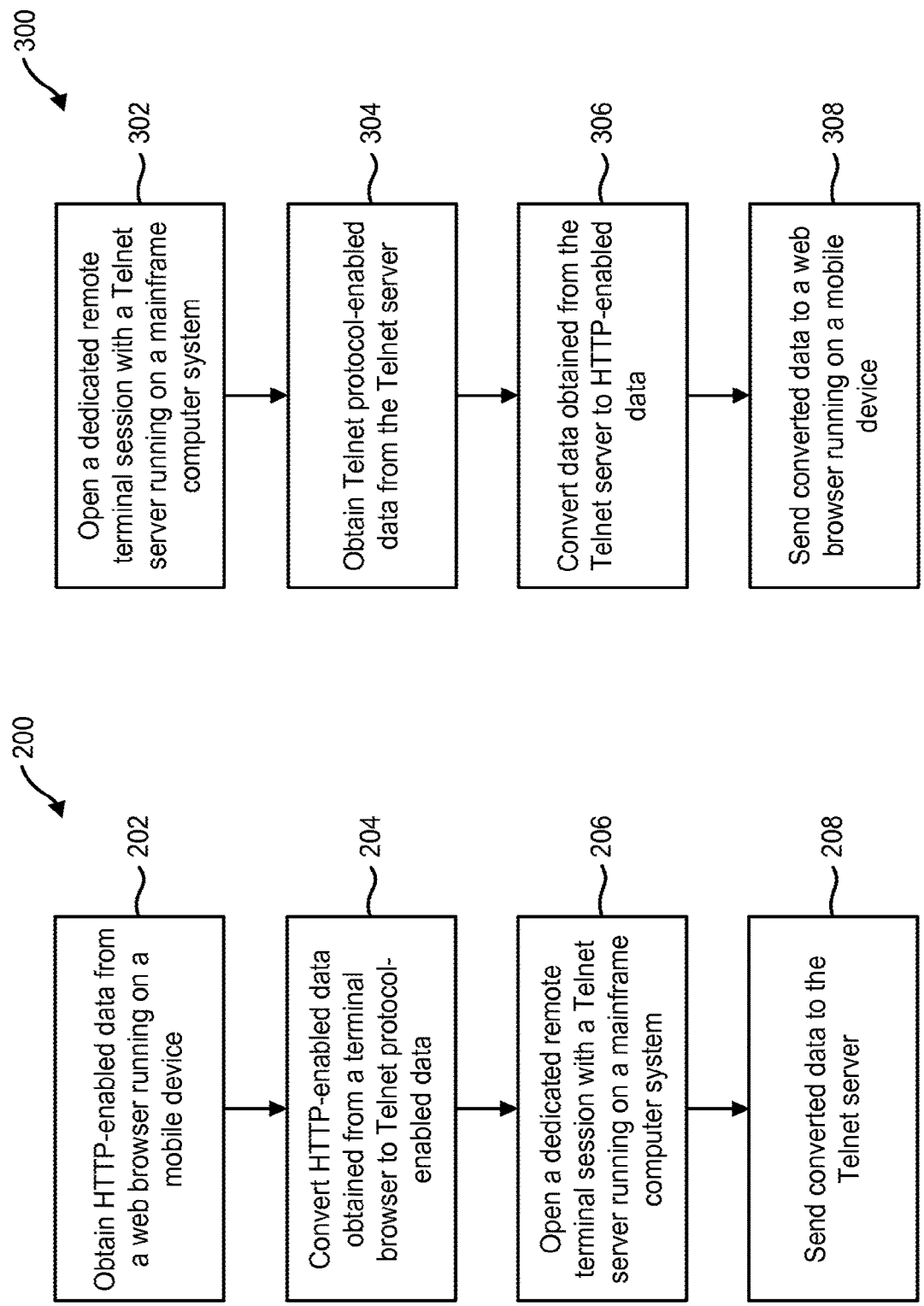

TERMINAL EMULATION OVER HTML

CROSS-REFERENCE TO RELATED APPLICATIONS

This application is a continuation of U.S. application Ser. No. 16/043,055, filed Jul. 23, 2018, which is a continuation of U.S. application Ser. No. 14/464,369, now U.S. Pat. No. 10,033,797, filed Apr. 20, 2014, the disclosures of each of these are incorporated herein by reference in their entireties.

TECHNICAL FIELD

The present invention relates generally to computers and computer-related technology. More specifically, the present invention relates to systems and methods for creating a communication link between a Telnet protocol enabled device and a HyperText Transfer Protocol (HTTP) enabled device.

BACKGROUND

The use of electronic devices has become increasingly prevalent in modem society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. Networks may link computers together that are a great distance apart.

One of the challenges involved with large networks is that information from a source may not be easily communicated to all the computers in a network. For example, delays in a network may hinder the communication of information. In some cases, the challenges involved with large networks leads to informational inconsistencies across the network. Such inconsistencies and miscommunications may result in errors throughout the network. As can be observed from this discussion, systems and methods that improve communication over a network may be beneficial.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the inventions scope, the exemplary embodiments of the invention will be described with additional specificity and detail through use of the accompanying drawings in which:

FIG. 2 is a flow diagram of a method for converting HTTP-enabled data to Telnet protocol-enabled data.

FIG. 3 is a flow diagram of a method for converting Telnet protocol-enabled data to HTTP-enabled data.

DETAILED DESCRIPTION

Figure 1:
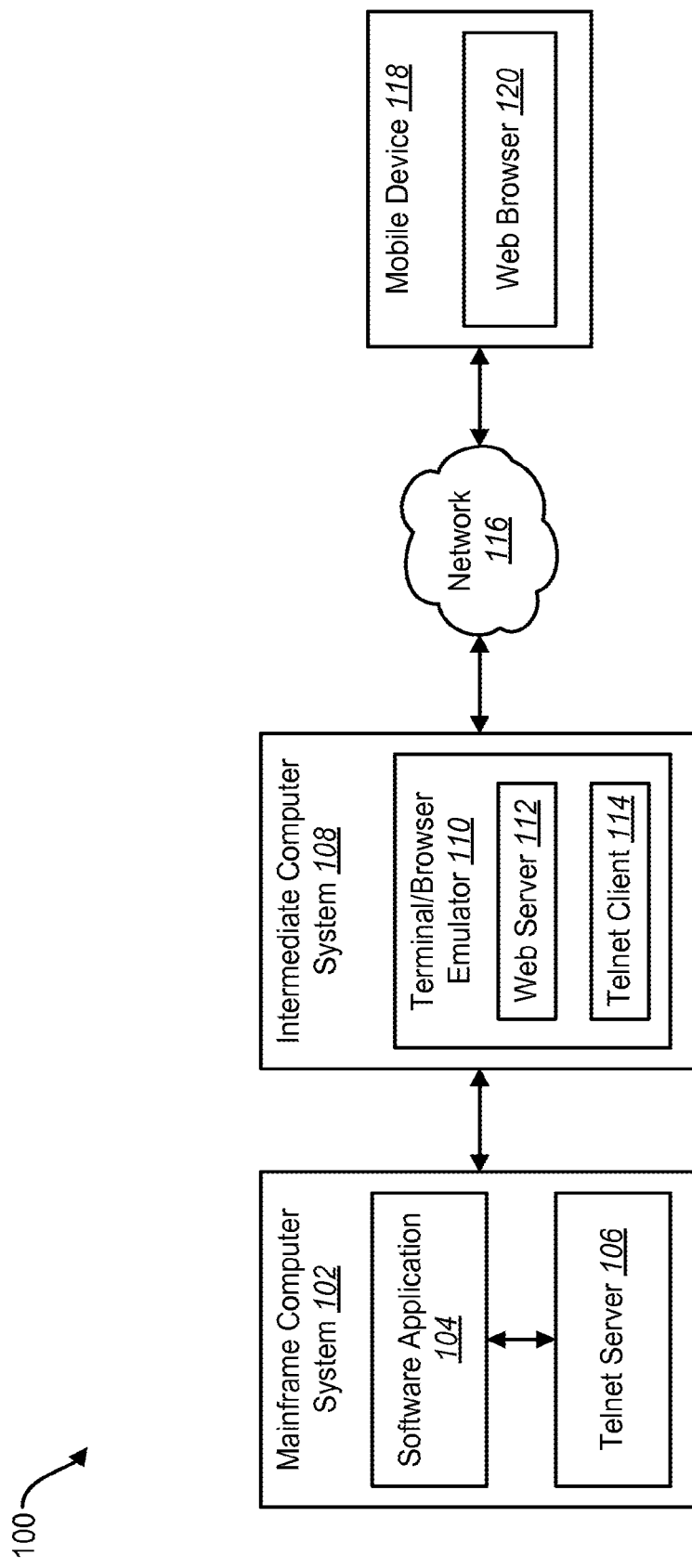
FIG. 1 illustrates a system in which some embodiments may be practiced.

A method for converting data between two data transfer protocol types is disclosed. A first HyperText Transfer Protocol (HTTP) enabled data is received from a first computer system. The first HTTP-enabled data obtained from the first computer system is converted to first remote terminal session data. The first remote terminal session data is sent to a second computer system via a remote terminal session.

The first computer system may be a mobile device. The mobile device may be a web browser. The HTTP-enabled data may be provided by the web browser. The first remote terminal session data may be Telnet protocol-enabled data. The method may be implemented by a terminal browser emulator running on an intermediate computer system. The intermediate computer system may be in electronic communication with the first computer system and the second computer system. The second computer system may be a mainframe computer system. The first remote terminal session data may be sent to a software application running on the second computer system.

The second remote terminal session may receive data from the second computer system via the remote terminal session. The second remote terminal session data may be converted to second HTTP-enabled data. The second HTTP-enabled data may be sent to the first computer system. The remote terminal session may be established with the second computer system.

A first component may appear as a web server to a web browser running on the first computer system. A second component may appear as a remote terminal session client to a remote terminal session server running on the second computer system. The first remote terminal session data may be Telnet protocol-enabled data. The remote terminal session client may be a Telnet client. The remote terminal session server may be a Telnet server.

There are many legacy applications in business today that implement a dedicated remote terminal session for transferring data. A dedicated remote terminal session may be created by using the Telnet protocol. A dedicated remote terminal session typically is a Transmission Control Protocol (TCP) connection with Telnet control data interspersed. A dedicated remote terminal session is generally a direct link between a Telnet client on a local computer system and a Telnet server on a remote computer system. A Telnet server may obtain data from a Telnet client and may send the data to business applications that are running on a remote computer system. For example, a business application could be an inventory control program, a licensed software program or a data logging program that are only located on the remote computer system. Dedicated remote terminals may also be emulated by software that is located on a local computer system and a remote computer system.

Emulation is the process of duplicating or imitating the functions of a remote computer system on a local computer system and may be done by commodity computing hardware. Commodity computing hardware may include pieces of computer hardware or a plurality of computer systems used in combination with other computer hardware and computer systems to increase the overall computing power of the commodity computing hardware. Mobile devices are being used more prevalently in business applications and may also be considered a piece of commodity computing hardware. A mobile device is a small handheld computing device that is capable of running advanced software applications and completing advanced tasks. Some examples of mobile devices are smart phones, tablets, and Personal Digital Assistants (PDA). Mobile devices typically do not come with Telnet protocol enabled software programs.

For mobile devices there are only a handful of terminal emulation programs currently available. Most of the terminal emulation programs are not very robust and are simple programs that are insufficient for the needs of most businesses. The terminal emulation programs are loaded on a mobile device and create a dedicated terminal session between the mobile device and a remote computer system. Typically, terminal emulation programs are customized for each mobile device that is going to implement the terminal emulation program. Customization for each mobile device to be used may involve a considerable amount of maintenance and upkeep. For example, when the mobile device's operating system is updated, the system library used by the terminal emulation program for rendering telnet enabled data could become outdated and may improperly render data until an update to the terminal emulation program can be made. For another example, the terminal emulation program may be designed to operate on a mobile device with an aspect ratio of 480×320, but the mobile device the terminal emulation program is implemented by has an aspect ratio of 960×640. The difference in aspect ratio may cause the terminal emulation program to not properly render data until an update to the terminal emulation program can be made. Obtaining and installing the terminal emulation program every time a new mobile device is connected to a network is another difficulty the current terminal emulation programs create. For yet another example, creation of a new operating system may also require extensive maintenance to update the terminal emulation program. If this maintenance is not done to the terminal emulation program the terminal emulation program may not operate at all.

Most mobile devices come with advanced full-featured HTTP-enabled programs, such as Apple Safari, Mozilla Firefox and Microsoft Internet Explorer. The methods and configurations disclosed herein describe ways to enable communication between HTTP-enabled programs and Telnet protocol-enabled programs. Telnet protocol is generally a text only medium and HTTP is generally a protocol capable of transferring data that contains audio and visual information and is implemented by HyperText Markup Language (HTML). HTML formatted data may include Java Script. Java Script may be used to emulate page based terminal types. The page based terminal types may show a collection of text entry fields. These fields may then be populated with desired information and then may be sent in a single message to the intermediate computer system. An HTTP-enabled browser on a mobile device may be used to collect data and send the data to an intermediate computer system. The intermediate computer system contains a terminal/browser emulator that converts the data from HTTP to Telnet protocol. The converted data may be sent to a terminal server located on a mainframe computer system that implements the business application the converted data is intended for.

The methods and configurations disclosed herein may also be done in the opposite direction. The terminal browser emulator is capable of converting data obtained from a Telnet server that implements Telnet protocol to HTTP and sending the converted data to a web browser located on a mobile device. A web browser may be a standard web browser that is an unmodified off-the-shelf program. Converting data obtained from the Telnet server may be done by examining received data, rendering commands, text, text position commands, text color and text entry fields. Telnet enabled data may dictate communication routines and rendering routines and the received data and rendering commands may be converted to HTML data and rendering commands that are transferred using HTTP. The emulator may have to resolve several issues when converting data between Telnet protocol and HTTP. One issue may be Telnet protocol expects a dedicated remote terminal session to exist for the duration of the data transferring session whereas HTTP expects a session to close immediately after completing the transfer of data.

FIG. 1 illustrates a system 100 in which some embodiments may be practiced. The system 100 may include a mobile device 118 and an intermediate computer system 108 that are connected to one another via one or more computer networks 116. The system 100 may also include a mainframe computer system 102 that is connected to the intermediate computer system 108. The network(s) 116 may include one or more local area networks (LANs), one or more wide area networks (WANs), etc. Communication via the network(s) 116 may utilize wired and/or wireless technologies. The network(s) 116 may include one or more enterprise networks, i.e., networks that are owned and/or under the control of an enterprise (e.g., a corporation, a non-profit organization, a school, etc.).

The mobile device 118 may include a web browser 120 that is used to interact with (e.g., send data to and/or receive data from) other computer systems. For example, the web browser 120 may be used to collect front end data such as order quantity, product type or product item. Through the methods disclosed herein the web browser 120 may be used to interact with a software application 104 running on the mainframe computer system 102. The data requested and collected by the web browser 120 may be HTTP-enabled data and may be sent to the intermediate computer system 108 through the network(s) 116.

The mainframe computer system 102 may be connected to an intermediate computer system 108. The mainframe computer system 102 may use a software application 104 that has particular business functionalities. For example, the software application 104 could be a backroom stock program used to keep track of inventory, track where goods are stored or manage back-logged order tracking. The software application 104 may be a legacy application (i.e., an older software program). The software application 104 may not be Internet-dependent, and may not be capable of understanding HTTP-enabled data.

A remote terminal session server may be running on the mainframe computer system 102 and used to create a dedicated remote terminal session with another computer system in order to provide user access to the software application 104. A dedicated remote terminal session is generally a direct link between the remote terminal session server 106 running on the mainframe computer system 102 and a remote computer system that allows data to be transferred between the two computer systems by implementing a remote terminal session protocol. The remote terminal session may be conducted in accordance with the Telnet protocol, in which case the remote terminal session server may be a Telnet server 106.

The intermediate computer system 108 may be capable of creating communication links between the web browser 120 on the mobile device 118 and the software application 104 running on the mainframe computer system 102. The intermediate computer system 108 may use a terminal/browser emulator 110 to create a communication link between the mobile device 118 and the mainframe computer system 102.

The terminal/browser emulator 110 may include a first component that appears as a web server 112 to the web browser 120 running on the mobile device 118. The terminal/browser emulator 110 may also include a second component that appears as a remote terminal session client (e.g., Telnet client 114) to the remote terminal session server (e.g., Telnet server 106) running on the mainframe computer system 102.

The terminal/browser emulator 110 may open a dedicated remote terminal session between the Telnet client 114 and the Telnet server 106 running on the mainframe computer system 102. HTTP-enabled data may be obtained from the mobile device 118 through the web server 112 within the terminal/browser emulator 110.

As used herein, the term "HTTP-enabled data" may refer to data that is transferred from a local computer to a remote computer system using HTTP. HTTP-enabled data may include HTML data. HTTP-enabled data may or may not include data used to enable the transfer between computer systems. In accordance with the present disclosure, the HTTP-enabled data may be converted to Telnet protocol-enabled data and sent to the mainframe computer system 102 using the dedicated remote terminal session between the Telnet client 114 and Telnet server 106.

As used herein, the term "remote terminal session data" may refer to data that is transferred from a local computer to a remote computer system using a remote terminal session protocol, such as Telnet. As used herein, the term "Telnet protocol-enabled data" may refer to data that is transferred from a local computer to a remote computer system using the Telnet protocol. Telnet protocol-enabled data may or may not include data used to enable the transfer between the computer systems. Telnet protocol-enabled data is a specific example of remote terminal session data.

The terminal/browser emulator 110 may also obtain data from the Telnet server 106 through the dedicated remote terminal session. The Telnet protocol-enabled data may be converted to HTTP-enabled data and sent to the mobile device 118 through the network(s) 116.

FIG. 2 is a flow diagram of a method 200 for converting HTTP-enabled data to Telnet protocol-enabled data. The method 200 may be performed by a terminal/browser emulator 110 running on an intermediate computer system 108. The intermediate computer system 108 may have a direct connection or a network connection with a mainframe computer system 102. A direct connection may be a direct link between two computer systems with no intermediate nodes in between. A node may be a router, another computer system, a server, etc. A network connection may be a link between two computer systems that has one or more nodes in between. The terminal/browser emulator 110 may be configured to convert HTTP-enabled data collected by a mobile device 118 to Telnet protocol-enabled data that the Telnet server 106 may obtain and transfer to a software application 104 running on a mainframe computer system 102.

The mobile device 118 may obtain data (e.g., front end data) that is to be sent to a software application 104 running on a mainframe computer system 102. The data may be obtained from a user via the web browser 120. This data may be HTTP-enabled data and the software application 104 may only be compatible with data transferred from the Telnet server 106 that was received through the Telnet protocol. The terminal/browser emulator 110 may obtain 202 the HTTP-enabled data from the web browser 120 running on the mobile device 118. The HTTP-enabled data may be converted 204 by the terminal/browser emulator 110 to Telnet protocol-enabled data.

A dedicated remote terminal session may be opened 206 between the terminal/browser emulator 110 and a Telnet server 106 running on the mainframe computer system 102. The terminal/browser emulator 110 may send 208 the converted data to the Telnet server 106 running on the mainframe computer system 102. The Telnet server 106 may forward the converted data to a software application 104 running on the mainframe computer system 102.

FIG. 3 is a flow diagram of a method 300 for converting Telnet protocol-enabled data to HTTP-enabled data. The method 300 may be performed by a terminal/browser emulator 110 running on an intermediate computer system 108. The intermediate computer system 108 may have a direct connection or a network connection to a mainframe computer system 102. The terminal/browser emulator 110 may be configured to convert data (e.g., back end data) sent by a software application 104 through a Telnet server 106 running on the mainframe computer system 102 to HTTP-enabled data that is compatible with a web browser 120 running on a mobile device 118.

The terminal/browser emulator 110 may open 302 a dedicated remote terminal session with a Telnet server 106 running on the mainframe computer system 102. The terminal/browser emulator 110 may obtain 304 Telnet protocol-enabled data from the Telnet server 106. The Telnet protocol-enabled data may originate from a software application 104 that is running on the mainframe computer system 102.

The Telnet protocol-enabled data may be converted 306 by the terminal/browser emulator 110 to HTTP-enabled data. The converted data may be sent 308 to a web browser 120 running on a mobile device 118. The web browser 120 may only be compatible with HTTP-enabled data. The web browser 120 may use this data for front end business services.

Figure 4:
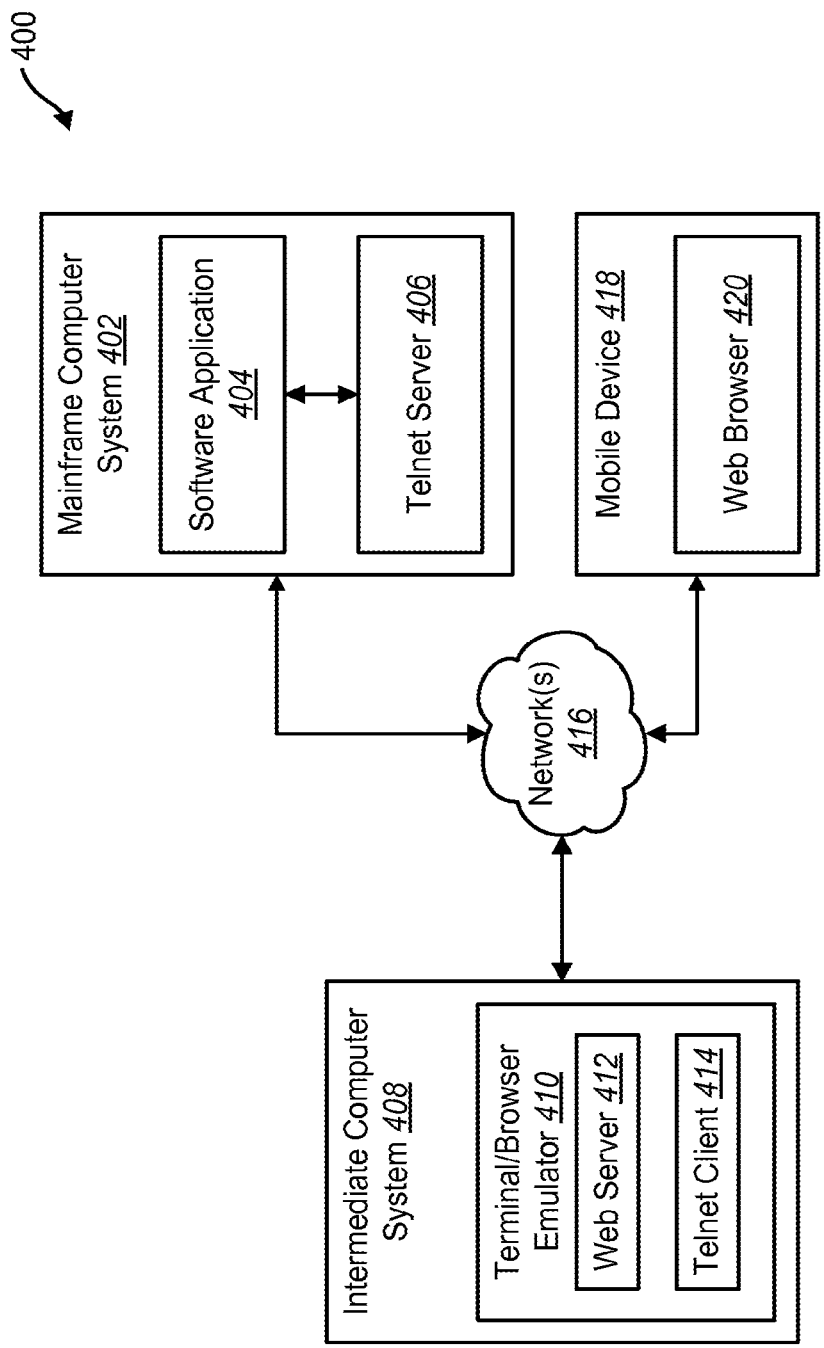
FIG. 4 illustrates another system in which some embodiments may be practiced.

FIG. 4 illustrates another system 400 in which some embodiments may be practiced. The system 400 may include a mainframe computer system 402, a mobile device 418 and an intermediate computer system 408 that are connected to one another via one or more computer networks 416. The network(s) 416 may be similar to the network(s) 116 discussed above in connection with FIG. 1.

The mobile device 418 may include a web browser 420 that is used to request data from other computer systems and collect front end data. The data requested and collected by the web browser 420 may be HTTP-enabled data and may be sent to the intermediate computer system 408 through the network(s) 416.

The mainframe computer system 402 may include a software application 404 that has particular business functionalities. A Telnet server 406 may also be running on the mainframe computer system 402. The Telnet server 406 may be used to create a dedicated remote terminal session with other computer systems connected to the network(s) 416. The dedicated remote terminal session allows data transfer between the intermediate computer system 408 and the mainframe computer system 402 through a network connection rather than through a direct connection.

The intermediate computer system 408 is capable of creating communication links between the HTTP-enabled web browser 420 on the mobile device 418 and the Telnet protocol-enabled Telnet server 406 running on the mainframe computer system 402. The intermediate computer system 408 may include a terminal/browser emulator 410 that includes a web server 412 and a Telnet client 414. The Telnet client 414 may be used to create a dedicated remote terminal session with the Telnet server 406 through the network(s) 416. HTTP-enabled data may be obtained from the mobile device 418 by the web server 412 within the terminal/browser emulator 410. The terminal/browser emulator 410 may convert the HTTP-enabled data to Telnet protocol-enabled data. The terminal/browser emulator 410 may send the converted data to the mainframe computer system 402 using the dedicated remote terminal session. The terminal/browser emulator 410 may also obtain data from the Telnet server 406 through the dedicated remote terminal session. The Telnet protocol-enabled data may be converted to HTTP-enabled data and sent to the mobile device 418 through the network(s) 416.

Figure 5:
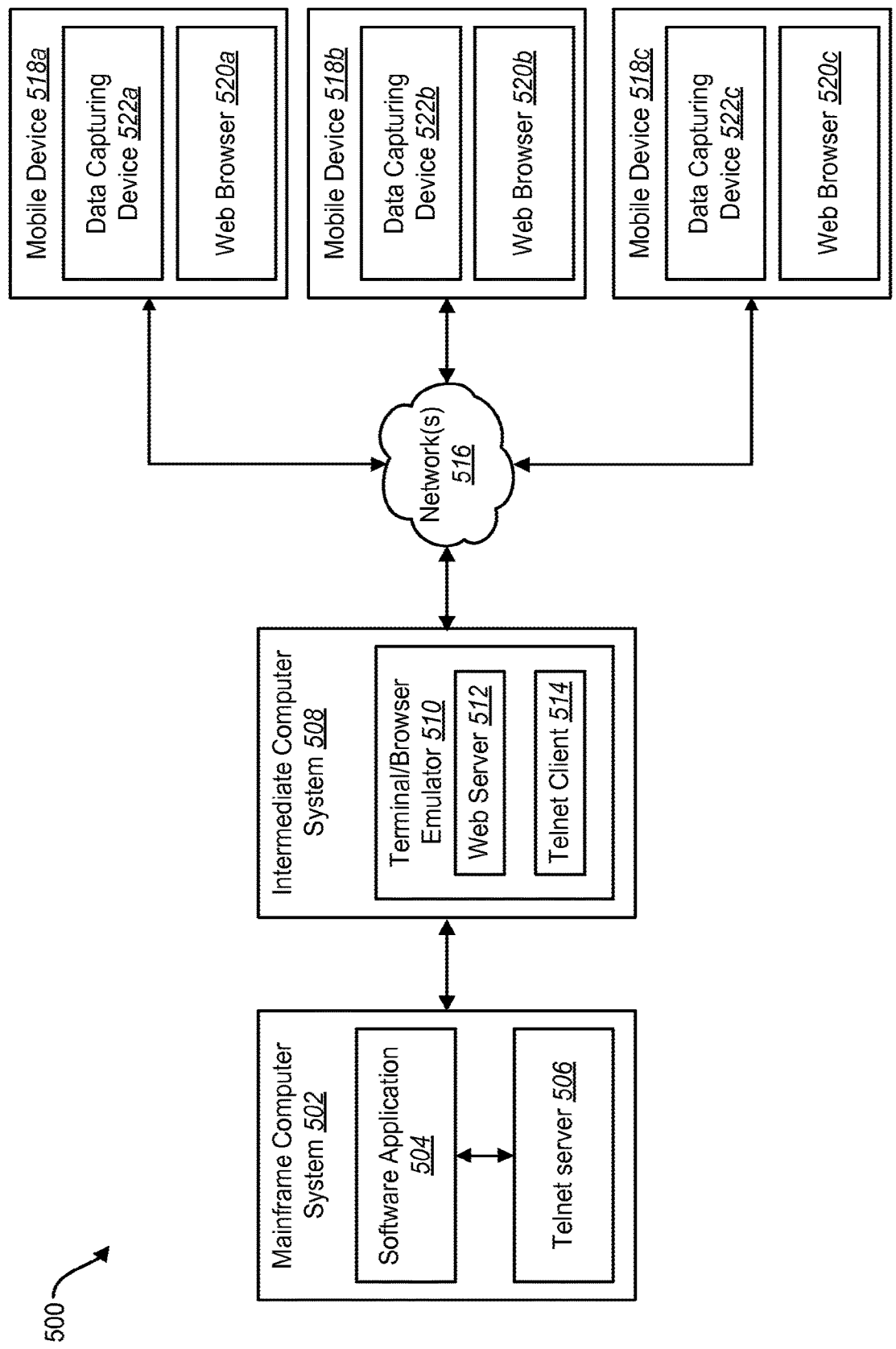
FIG. 5 illustrates yet another system in which some embodiments may be practiced.

FIG. 5 illustrates yet another system 500 in which some embodiments may be practiced. The system 500 may include a plurality of mobile devices 518*a-c* that are connected to one or more computer network(s) 516. The mobile devices 518*a-c* may include web browsers 520*a-c* that are used to request data from other computer systems or other mobile devices 518*a-c* connected to the network(s) 516. The mobile devices 518*a-c* may also include a data capturing device 522*a-c* used to collect front end data. For example, the data capturing devices 522*a-c* may be barcode scanners, credit card scanners, radio frequency identification (RFID) tag scanners, etc. The web browsers 520*a-c* may be used to upload and send data to other devices connected to the network. The mobile devices 518*a-c* may send the collected data to an intermediate computer system 508 through the network(s) 516. The data requested and collected by the web browsers 520*a-c* may be HTTP-enabled data and may be sent to the intermediate computer system 508 through the network(s) 516.

The system 500 may include a mainframe computer system 502 that may be connected to an intermediate computer system 508. The mainframe computer system 502 may use a software application 504 that has particular business functionalities. The software application 504 may be a legacy application. A Telnet server 506 may be running on the mainframe computer system 502 and used to provide user access to the software application 504 by creating a dedicated remote terminal session with other computer systems.

An intermediate computer system 508 that is capable of creating a communication link between the HTTP enabled web browsers 520*a-c* and the Telnet protocol-enabled Telnet server 506 may also be included in the system 500. The intermediate computer system 508 may include a terminal/browser emulator 510 running a web server 512 and a Telnet client 514 to create a communication link between all of the mobile devices 518*a-c* and the mainframe computer system 502 simultaneously. The terminal/browser emulator 510 may open a dedicated remote terminal session between the Telnet client 514 and the Telnet server 506 running on the mainframe computer system 502 for each mobile device 518*a-c*. HTTP-enabled data may be sent by the mobile devices 518*a-c* to the web server 512 within the terminal/browser emulator 510 and may be converted to Telnet protocol-enabled data and sent to the mainframe computer system 502 using the dedicated remote terminal session. The terminal/browser emulator 510 may also obtain data from the Telnet server 506 through the dedicated remote terminal session. The Telnet protocol-enabled data received from the Telnet server 506 may be converted to HTTP-enabled data and sent to the mobile devices 518*a-c*. The terminal/browser emulator 510 may open a connection with the mobile devices 518*a-c* every time data is sent by the mobile devices 518*a-c* or data is requested from the mobile devices 518*a-c* by the mainframe computer system 502.

Figure 6:
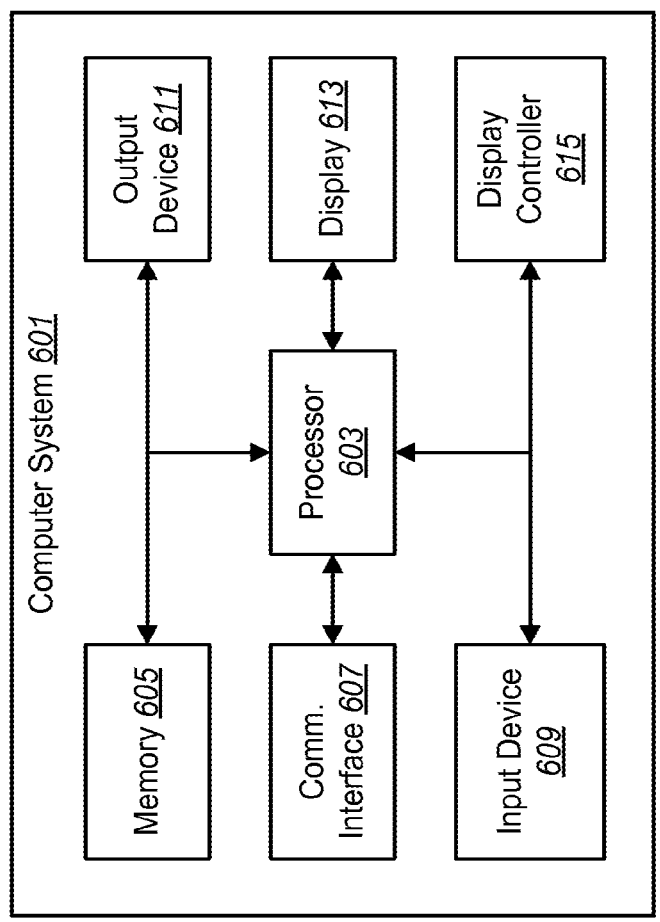
FIG. 6 is a block diagram illustrating the major hardware components typically utilized in a computer system.

FIG. 6 is a block diagram illustrating the major hardware components typically utilized in a computer system 601. The mainframe computer systems 102,402, 502, intermediate computer systems 108, 408, 508, and mobile devices 118, 418, 518 described previously may include components similar to those shown in the computer system 601. The illustrated components may be located within the same physical structure or in separate housings or structures.

The computer system 601 includes a processor 603 and memory 605. The processor 603 controls the operation of the computer system 601 and may be embodied as a microprocessor, a microcontroller, a digital signal processor (DSP) or other device known in the art. The processor 603 typically performs logical and arithmetic operations based on program instructions stored within the memory 605.

As used herein, the term memory 605 is broadly defined as any electronic component capable of storing electronic information, and may be embodied as read only memory (ROM), random access memory (RAM), magnetic disk storage media, optical storage media, flash memory devices in RAM, on-board memory included with the processor 603, EPROM memory, EEPROM memory, registers, etc. The memory 605 typically stores program instructions and other types of data. The program instructions may be executed by the processor 603 to implement some or all of the methods disclosed herein.

The computer system 601 typically also includes one or more communication interfaces 607 for communicating with other electronic devices. The communication interfaces 607 may be based on wired communication technology, wireless communication technology, or both. Examples of different types of communication interfaces 607 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 601 typically also includes one or more input devices 609 and one or more output devices 611. Examples of different kinds of input devices 609 include a keyboard, mouse, microphone, remote control device, button, joystick, trackball, touchpad, lightpen, etc. Examples of different kinds of output devices 611 include a speaker, printer, etc. One specific type of output device which is typically included in a computer system is a display device 613. Display devices 613 used with embodiments disclosed herein may utilize any suitable image projection technology, such as a cathode ray tube (CRT), liquid crystal display (LCD), light-emitting diode (LED), gas plasma, electroluminescence, or the like. A display controller 615 may also be provided, for converting data stored in the memory 605 into text, graphics, and/or moving images (as appropriate) shown on the display device 613.

Of course, FIG. 6 illustrates only one possible configuration of a computer system 601. Various other architectures and components may be utilized.

Information and signals may be represented using any of a variety of different technologies and techniques. For example, data, instructions, commands, information and signals that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for converting data between two data transfer protocol types, comprising:
   receiving, at an emulator and from a software application of a first computer system, first remote terminal session data, the first remote terminal session data being back end data formatted according to a remote terminal session protocol used by the software application that is not Internet-dependent and not capable of using the HyperText Transfer Protocol (HTTP)-enabled data;
   opening, by the emulator, a dedicated remote terminal session between a remote terminal session server of the first computer system and two or more second computer systems;
   converting, by the emulator, the first remote terminal session data to first HTTP-enabled data, the first HTTP-enable data being representative of the first remote terminal session data, formatted according to a HTTP protocol, and being usable by web browsers of the two or more second computer systems that is only be compatible with HTTP-enabled data, wherein the converting includes:
      examining the received first remote terminal session data;
      rendering one or more or a combination of communication routines, rendering routines, commands, text, text position commands, text color, and text entry fields of the first remote terminal session data; and
      resolving session duration between the remote terminal session protocol and the HTTP protocol; and
   sending, by the emulator, the first HTTP-enabled data to the web browsers of the two or more second computer systems via the dedicated remote terminal session.

2. The method of claim 1, wherein the dedicated remote terminal session is opened emulator every time the data is requested from the two or more second computer systems.

3. The method of claim 1, wherein the dedicated remote terminal session includes a simultaneous a communication link between the two or more second computer systems and the first computer system.

4. The method of claim 1, wherein:
   the software application includes a particular business functionality; and
   the particular business functionality includes a backroom stock program that is used to keep track of inventory, track where goods are stored, or manage back-logged order tracking.

5. The method of claim 1, wherein the emulator includes a first component that appears as a web server to the web browser and includes a second component that appears as a remote terminal session client to the remote terminal session server.

6. The method of claim 5, wherein the dedicated remote terminal session is opened between the first component and the second component.

7. The method of claim 1, wherein the web browser includes a standard web browser that is an unmodified off-the-shelf program.

8. The method of claim 1, wherein:
   the second computer system includes a mobile device; and
   the mobile device includes a data capturing device configured to collect front end data.

9. The method of claim 8, wherein the data capturing devices includes a barcode scanner, a credit card scanner, or a radio frequency identification (RFID) tag scanner.

10. The method of claim 1, wherein remote terminal session protocol includes a Telnet Protocol.

11. A non-transitory computer-readable medium having encoded therein programming code executable by one or more processors to perform or control performance of operations of converting data between two data transfer protocol types, the operations comprising:

receiving, at an emulator and from a software application of a first computer system, first remote terminal session data, the first remote terminal session data being back-end data formatted according to a remote terminal session protocol used by the software application that is not Internet-dependent and not capable of using the HyperText Transfer Protocol (HTTP)-enabled data;

opening, by the emulator, a dedicated remote terminal session between a remote terminal session server of the first computer system and two or more second computer systems;

converting, by the emulator, the first remote terminal session data to first HTTP-enabled data, the first HTTP-enable data being representative of the first remote terminal session data, formatted according to a HTTP protocol, and being usable by web browsers of the two or more second computer systems that is only be compatible with HTTP-enabled data, wherein the converting includes:

examining the received first remote terminal session data;

rendering one or more or a combination of communication routines, rendering routines, commands, text, text position commands, text color, and text entry fields of the first remote terminal session data; and resolving session duration between the remote terminal session protocol and the HTTP protocol; and sending, by the emulator, the first HTTP-enabled data to the web browsers of the two or more second computer systems via the dedicated remote terminal session.

12. The non-transitory computer-readable medium of claim 11, wherein the dedicated remote terminal session is opened emulator every time the data is requested from the two or more second computer systems.

13. The non-transitory computer-readable medium of claim 11, wherein the dedicated remote terminal session includes a simultaneous a communication link between the two or more second computer systems and the first computer system.

14. The non-transitory computer-readable medium of claim 11, wherein:

the software application includes a particular business functionality; and the particular business functionality includes a backroom stock program that is used to keep track of inventory, track where goods are stored, or manage back-logged order tracking.

15. The non-transitory computer-readable medium of claim 11, wherein the emulator includes a first component that appears as a web server to the web browser and includes a second component that appears as a remote terminal session client to the remote terminal session server.

16. The non-transitory computer-readable medium of claim 15, wherein the dedicated remote terminal session is opened between the first component and the second component.

17. The non-transitory computer-readable medium of claim 11, wherein the web browser includes a standard web browser that is an unmodified off-the-shelf program.

18. The non-transitory computer-readable medium of claim 11, wherein:

the second computer system includes a mobile device; and the mobile device includes a data capturing device configured to collect front end data.

19. The non-transitory computer-readable medium of claim 18, wherein the data capturing devices includes a barcode scanner, a credit card scanner, or a radio frequency identification (RFID) tag scanner.

20. The non-transitory computer-readable medium of claim 11, wherein remote terminal session protocol includes a Telnet Protocol.

* * * * *